Nov. 30, 1943.  A. C. KORTE ET AL  2,335,424
WINDSHIELD WIPER PARKING DEVICE
Filed Nov. 25, 1941

INVENTOR
KENNETH LANNERT
ALFRED C. KORTE
ATTORNEY

Patented Nov. 30, 1943

2,335,424

UNITED STATES PATENT OFFICE 2,335,424

WINDSHIELD WIPER PARKING DEVICE

Alfred C. Korte, St. Louis, and Kenneth Lannert, St. Johns Station, Mo., assignors to Carter Carburetor Corporation, St. Louis, Mo., a corporation of Delaware Application November 25, 1941, Serial No. 420,395

3 Claims. (Cl. 15—253)

This invention relates to motor control means and consists particularly in a novel parking device for use, more particularly, with automobile windshield wiper motors.

A satisfactory windshield wiper control must be of the pre-selecting variety in which, regardless of the time when the control is actuated, the wiper blade or blades will be stopped or "parked" at the ends of their normal strokes so as to be out of the driver's direct line of vision. Where the blades are operated by an electric motor, the control must cut off the supply of electric current to the motor and, preferably, should provide a mechanical stop for the wiper blades to prevent coasting and insure parking of the blades at the proper position.

An object of the invention is to provide a motor control which is applicable with advantage to a motor used for operating a windshield wiper blade and which control fulfills the above mentioned requirements and is further of unusual durability and simplicity.

In the accompanying drawing which illustrates the invention

Figure 1:
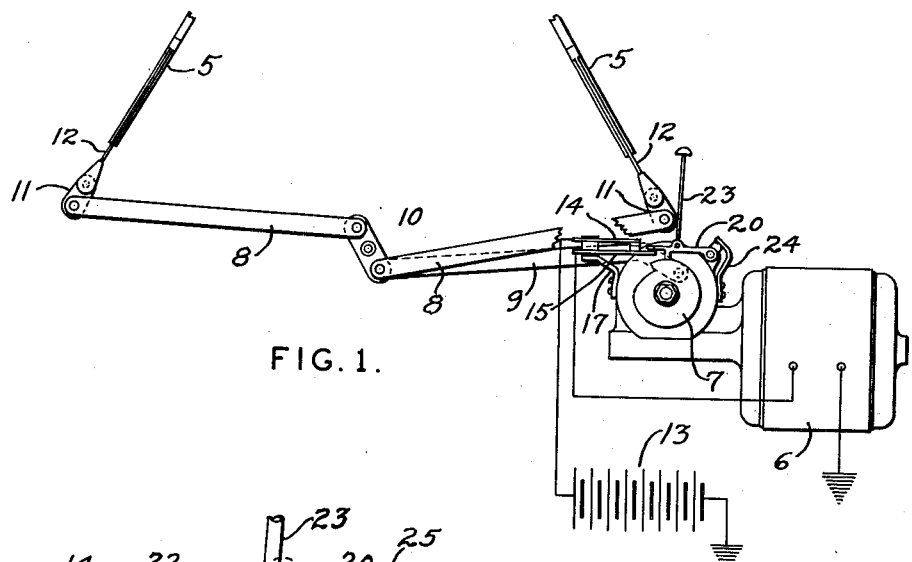
Fig. 1 is a front view of an automobile windshield wiping device including the operating motor and control means therefor.

The wiping device illustrated is adapted to be mounted on an automobile or truck, but the manner of mounting may be conventional and is not shown. The wiper blades 5 are operated by an electric motor 6 through the intermediary of a rotating plate 7, suitably geared to the motor, transmission links 8 and 9, and a centrally pivoted lever 10. Link 9 is eccentrically pinned at its ends to plate 7 and to lever 10 and links 8 are pinned, respectively, to the opposite ends of lever 10 and to small cranks 11 which directly operate wiper arms 12 carrying blades 5. Motor 6 derives its operating current from the usual battery 13, the motor and battery each having a grounded lead, as shown. The other lead of the battery is connected to the motor through switch points 14 and 15 mounted on an insulator 16 carried by bracket 17 secured to the side of motor 6. The connection is such that when switch points 14 and 15 are closed, disc 7 will be rotated counter-clockwise by the motor and the wiper blades will be caused to reciprocate across the outer surface of the windshield.

Figure 2:
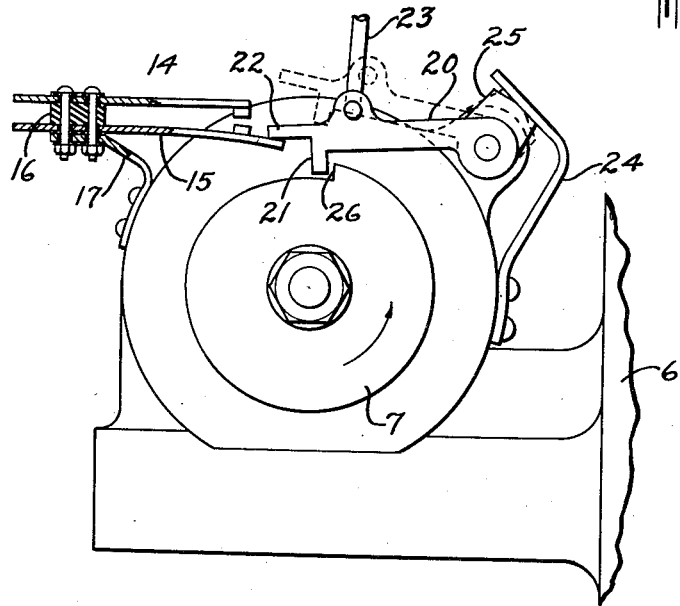
Fig. 2 is an enlarged view showing the wiper control or parking device.

A detent 20 is pivoted at the side of motor 6 opposite the switch points and has a pair of fingers 21 and 22, the former of which may co-operate with a shoulder 26 formed in the edge of disc or plate 7, as described hereafter, and the latter of which may engage lower switch point 15 to open the switch. A thin rod 23 extends upwardly from detent 20 to a convenient position to be actuated by the driver to control the wipers. A spring strip 24 is secured to the side of motor 6 beneath detent 20 and overlies an angular, exposed surface of an element 25 formed rigidly with the detent. Spring 24 and angular element 25 function as resilient, over-center mechanism to maintain detent 20 either in its operative position, as shown in Fig. 2, or in its inoperative position as shown in Fig. 1 and in dotted lines in Fig. 2.

The control operates as follows:

When control rod 23 is depressed, spring strip 24 engages the right hand or lower portion of angular element 25, whereupon finger 21 of detent 20 is caused to resiliently ride upon the edge of cam disk 7. When the low point of the cam disk is reached, detent 20 follows downwardly, causing finger 22 to open switch points 14 and 15. Thereafter, finger 21 cooperates with shoulder 26 to mechanically stop the wiper blades and motor and prevent further coasting. Of course, the low point of the cam may be merely a notch so as to prevent any coasting of the wiper, but the more gradual stopping caused by the form of cam disk shown as advantages. Shoulder 26 is adjusted so that the motor and wiper blades will be stopped at a desired point in their operation, preferably at the outer end of the wiper stroke.

While the control detent 20 is shown applied to a rotating disk 7, in effect, a cam, a similar arrangement may be conveniently used in connection with a reciprocating part or, in fact, a part which is subjected to any kind of cyclical movement with the wiper blade, it being only necessary that the switch actuator and stop detent 20 be prevented from cutting off the motor until the pre-selected point is approached or reached. The invention may be modified in various respects as will occur to those skilled in the art and the exclusive use of all such modifications as come within the scope of the appended claims is contemplated.

We claim:

1. An electric motor control comprising a member adapted for cyclical movement with the motor, said member having a control surface, a normally resiliently closed switch to control the supply of current to the motor, a switch actuator, and resilient over-center mechanism constructed and arranged to be selectively moved to a position in which it is inoperative to control said actuator and switch and to an operative position in which it causes said actuator to follow said surface and open said switch as determined by said surface, said actuator, when in its operative position, cooperates with said cyclical member to mechanically stop the motor subsequent to the opening of said switch.

2. A parking control for electric windshield wipers comprising a member subject to cyclical movement with the wiper, a current controlling switch, said member having a cam-like surface with a low point and a shoulder adjacent the same, a switch actuator having parts for engaging said switch and said surface when moved in the parking direction, and a resilient device rendered operative by parking movement of said actuator to urge the latter against said surface and to cause said actuator, when it reaches said low point and said shoulder, to successively open said switch and mechanically stop the wiper.

3. A parking control for electric windshield wipers comprising a cam-like member subject to cyclical movements with the wiper and having a low point and an adjacent shoulder, a current controlling switch having a movable contact finger normally resiliently closed, a switch actuator having parts positioned to coincidentally engage said contact finger and said cam-like member when moved in the parking direction, and an over-center spring device rendered operative when said actuator is so moved to cause said actuator to follow said cam-like member and, when said actuator reaches said low point and said shoulder, to successively open said switch and mechanically stop the wiper.

ALFRED C. KORTE.
KENNETH LANNERT.